Aug. 26, 1947.　　W. J. LANDEN　　2,426,459
AUTOMATIC SHEAR
Filed Oct. 31, 1944
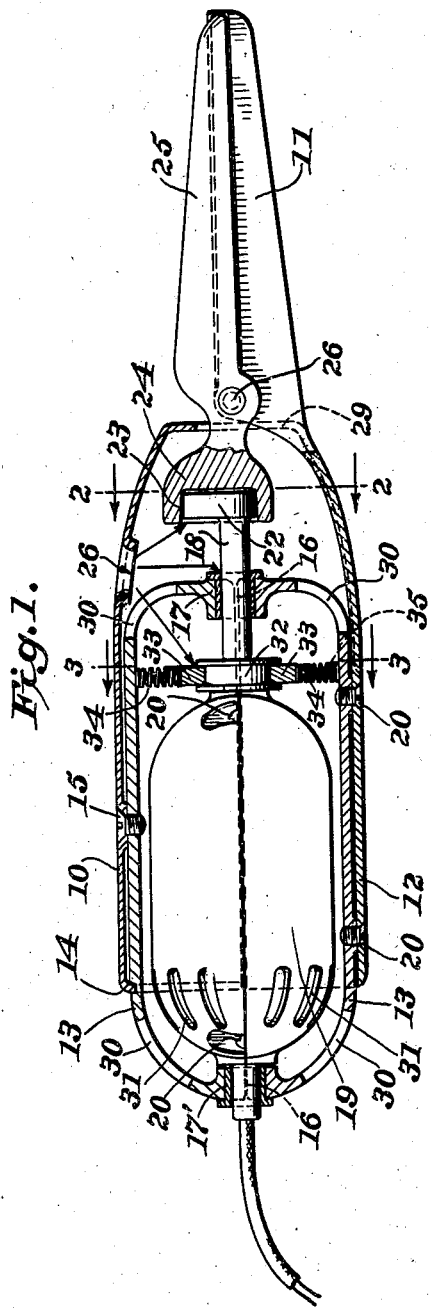
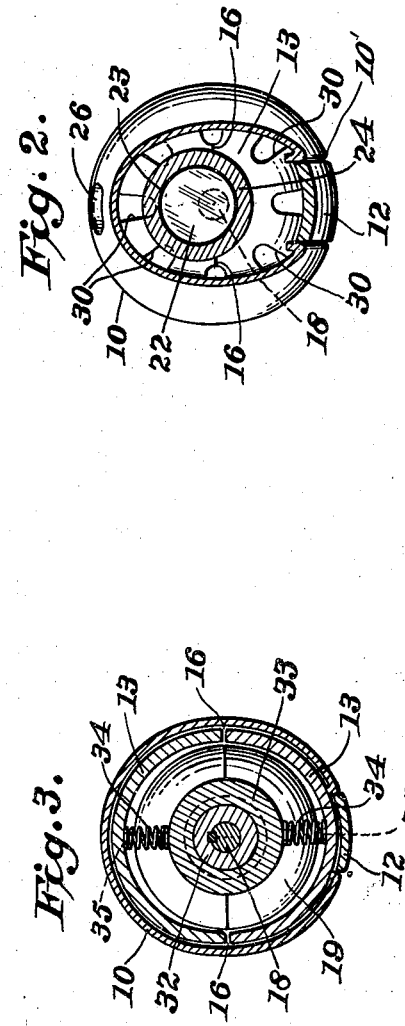
Inventor:
William James Landen,
By Cushman Darby & Cushman
Attorneys.

Patented Aug. 26, 1947

2,426,459

UNITED STATES PATENT OFFICE 2,426,459

AUTOMATIC SHEARS

William J. Landen, Lisbon, Ohio

Application October 31, 1944, Serial No. 561,267

7 Claims. (Cl. 30—228)

This invention has to do with motor actuated shears. This type of shears or cutters is broadly old, and the present invention is directed to improvements on that type as now known to me.

It has, among other objects, the provision of motor operated shears of simple, rugged construction; a type which may be produced at reasonable cost; in which the parts are readily accessible for replacement or repairs, and which may be easily handled and manipulated by the user. Furthermore, it provides a construction in which the number of parts going to make up the complete device are few; which lend themselves to easy production without the need of complicated mechanical operations, and the assembly of which parts into the final structure can be done without the necessity of employing highly skilled labor.

The device consists generally of a two-part housing so shaped and assembled as to form a readily manipulable handle for the user to grasp in operating the tool; a motor of any suitable or desired type enclosed in the housing; motor driven shear operating means of simple construction and easy of assembly set up completely within the housing, and cooperating shear blades disposed outside of the housing in such relation thereto as to permit the cutting operation to be readily carried out.

In the drawings herewith is illustrated one embodiment of the device, and in said drawings:

Figure 1 is a longitudinal sectional view through the tool, the shear blades being in elevation.

Figure 2 is a transverse sectional view on substantially the line 2—2 of Figure 1, looking in the direction of the arrows.

Figure 3 is a transverse sectional view on substantially the line 3—3 of Figure 1 looking in the direction of the arrows.

Reference will be made to the drawing by numbers, and the same numbers designate the same parts in the several views.

A hollow housing 10 of substantially cylindrical form and having an open rear end is provided. This housing may be made of any suitable material, metal being preferable, although this housing and other housing parts might be formed of a suitable plastic. The housing 10 has a longitudinal aperture or slot 10' (Fig. 2) so that the housing 10 can expand for a purpose presently to be described, and this aperture will be closed in assembling the device by a strip 12, and to that strip may be secured a fixed shear blade 11. The shear blade 11 is here shown as formed integral with the strip 12. Telescoping with and nested in the housing 10 is a second housing 13 which is engaged with the exterior housing 10 by inserting it at the rear open end of housing 10 and telescoping it to the position shown in Figure 1. The longitudinal aperture in the exterior housing permits the exterior housing 10 to expand as the inner housing 13 is forced into it. The strip 12 is secured in place to close the aperture in the housing 10 by means of screws 20 which engage the second housing 13, as shown in Figure 1. The housing 10 has at its rear open end a lip 14 which, as here shown, extends approximately half way around the open mouth of the split housing 10 as shown in Figure 1, and this lip engages a complementary recess in the housing 13, there being sufficient elasticity in the housing 10 to permit the lip 14 and recess to snap into and out of engagement when the parts are shifted. The two housings may additionally be held together in any suitable manner as by the removable screw 15, so that the exterior housing 10 and the housing 13 may be readily separated by removing the screw 15 and disengaging the inner housing from the lip 14.

The housing 13 is split longitudinally as indicated at 16, and is provided at its forward end with the bearing 17, and at its rear end with the bearing 17'. These bearings support the motor shaft 18 driven by a motor of any suitable type, a conventional electric motor being here shown, although any suitable type of motor may be used. If an electric motor is used, it and its power leads will be fully insulated from the other parts of the device. The motor casing or shell 19 is made in two parts held together in any suitable manner as by screws 20, so that the motor casing may be readily separated for installation or removal of the motor and its associated parts for repair or replacements.

The drive shaft 18 may be a direct continuation of a motor shaft having the desired R. P. M., or any usual reducing gearing may be provided, and, as stated, any suitable motor may be used. A direct drive electric motor, or one having reduction gearing, lends itself readily to the construction disclosed and eliminates the necessity of a complicated structure which might be necessary if other types of motors were used.

The forward end of the motor shaft 18 is provided with shear actuating means, here shown as an eccentric 22 engaging an open cup 23 in the rear of the shear actuating arm 24, which arm is carried by, and as here shown is integral with a shear blade 25 pivoted at 26 on the fixed shear blade 11. The housing 10 may taper at its front end, as shown, and extend over the operating parts and in close relation to the pivotal point 26 of the blades so as to guard against contact with the shear actuating parts of the mechanism within the housing. The housing 10 is preferably provided with an aperture 26' in such relation to the bearing 17 and the eccentric 22, that lubricant can be readily applied to the parts when needed.

The fixed shear blade 11 will preferably be carried by the removable closure strip 12, which strip is contoured to coincide with the contour of the exterior casing and, as stated, held in place by the screws 20, which engage the interior housing 13. With this construction the closure strip 12 and the fixed blade 11 carried thereby can be removed for sharpening or for replacement without the necessity of taking down the whole device. Where the fixed blade 11 is formed integral with the closure strip 12 as here shown, it will be understood that the metal of the blade will be of a character and temper to provide a suitable cutting edge.

The forward end of the exterior housing 10 is open at 29 as shown, and the front and rear ends of the interior housing 13 have apertures 30 as shown. The casing of the motor 19 is provided with air openings 31 so that there is an opportunity for free flow of air through the device when operating, and heating of the parts is avoided or minimized.

In order to damp vibration of the shaft 18, there is preferably provided a member 32 fixed on the shaft 18 just in advance of the motor casing 19, and on this member 32 is loosely mounted the spring held ring 33, the springs 34 holding the ring 33 elastically with respect to the inner housing 13, which housing has projections 35 to engage the outer ends of the springs. With this damping device, tendency of the shaft 18 to vibrate when the motor and its shaft are rotated is very materially reduced, and a smooth action of the rotating parts is secured.

It will be seen that the housing containing the operating parts is very compact and systematically disposed with respect to the cutting blades. This is of advantage, in that the fixed blade, the cutting edge of which is parallel to the longitudinal axis of the housing, may be conveniently moved along a supporting surface or table on which material to be cut is placed, and the device can be manipulated at a convenient angle relative to the work. As pointed out, the fixed blade carried by the strip can be removed, and where integral with the strip will be removed with such strip, and the movable blade with its eccentric head can also be removed with the fixed blade through the opening 29 at the front of the housing 10, and all of this can be accomplished without dismantling the other parts. Further, by providing the telescoping housing 13 which is nested within the outer housing 10, such housing 13, with its contained parts, may be readily withdrawn and the split interior housing 13 and the split motor housing 19 then separated for access to the parts for the necessary repairs or replacements.

This disclosure, it is to be understood, is illustrative and not restrictive. It will no doubt suggest mechanical variations to others. Such variations as are within the range of mechanical skill are to be regarded as within the range of my invention, which is not limited to the specific disclosure, except as by the terms of the appended claims.

I claim:

1. A device of the class described comprising an exterior housing having a longitudinal aperture in its wall, a closure strip for the aperture, a shear blade rigidly supported relative to said housing, an interior housing telescoped in said exterior housing, the longitudinal aperture in the exterior housing allowing the same to expand when the interior housing is forced into engagement therewith, a motor and drive shaft mounted for rotation in said interior housing, a movable shear blade pivoted in operative relation to said fixed shear blade, and blade actuating means within said exterior housing connecting said drive shaft with said movable shear blade.

2. A device of the class described comprising an exterior housing having a longitudinal aperture in its wall, a closure strip for the aperture, a shear blade rigidly supported by said strip, an interior housing telescoped in said exterior housing, means for securing said strip to said interior housing, a motor and drive shaft mounted for rotation in said interior housing, a movable shear blade pivoted in operative relation to said fixed shear blade, and blade actuating means connecting said drive shaft with said movable shear blade.

3. A device of the class described comprising an exterior housing having a longitudinal aperture in its wall, a closure strip for the aperture, a shear blade rigidly supported by and integral with said strip, an interior housing telescoped in said exterior housing, means for securing said closure strip to said interior housing, a motor and drive shaft mounted for rotation in said interior housing, a movable shear blade pivoted in operative relation to said fixed shear blade, and blade actuating means within said exterior housing connecting said drive shaft with said movable shear blade.

4. A device of the class described comprising an exterior housing having a longitudinal aperture in its wall, a closure strip for the aperture, a shear blade rigidly supported by and integral with said strip, an interior housing telescoped in said exterior housing, means for securing said closure strip to said interior housing, a motor and drive shaft mounted for rotation in said interior housing, a movable shear blade pivoted on said rigid blade in operative relation to said fixed shear blade, and blade actuating means within said exterior housing connecting said drive shaft with said movable shear blade.

5. A device of the class described comprising an exterior housing, a shear blade rigidly supported relative to said housing, an interior housing telescoped in said exterior housing, spring fastening means automatically engageable and disengageable on shifting of said telescoping housings to secure or release them, a motor and drive shaft mounted for rotation in said interior housing, a movable shear blade pivoted in operative relation to said fixed shear blade, and blade actuating means within said exterior housing connecting said drive shaft with said movable shear blade.

6. A device of the class described comprising an exterior housing, a shear blade rigidly supported relative to said housing, an interior housing telescoped in said exterior housing, spring rib and recess fastening means on said housing automatically engageable and disengageable on shifting of said telescoping housings to secure or release them, a motor and drive shaft mounted for rotation in said interior housing, a movable shear blade pivoted in operative relation to said fixed shear blade, and blade actuating means within said exterior housing connecting said drive shaft with said movable shear blade.

7. A device of the class described, comprising an exterior housing having a slot, a fixed shear blade adjacent the slot in said exterior housing, an interior housing telescoped in said exterior housing, means for detachably connecting the fixed shear blade to the interior housing, a motor and drive shaft mounted for rotation in said interior housing, a movable shear blade pivoted in operative relation to said fixed shear blade, and blade actuating means within said exterior housing connecting said drive shaft with said movable shear blade, the parts being constructed and arranged so that the fixed blade may be removed for replacement or sharpening without disturbing the other parts of the shears.

WILLIAM J. LANDEN.

REFERENCES CITED

The following references are of record in the file of this patent:

UNITED STATES PATENTS

| Number | Name | Date |
|---|---|---|
| 1,165,945 | Coffman et al. | Dec. 28, 1915 |
| 532,188 | Shannon | Jan. 8, 1895 |
| 110,259 | Martinson | Dec. 20, 1870 |
| 1,996,813 | Jeppsson | Apr. 9, 1935 |